United States Patent [19]

Nonweiler et al.

[11] Patent Number: 5,700,522
[45] Date of Patent: *Dec. 23, 1997

[54] AQUEOUS EMULSION-BASED COATING COMPOSITIONS

[75] Inventors: Mark A. Nonweiler, Oshkosh, Wis.; Gregory F. Konrad, Rte. 1, Box 299F, Van Dyne, Wis. 54979; Dennis A. Wiatrowski, Oshkosh, Wis.

[73] Assignee: Gregory F. Konrad, Van Dyne, Wis.

[*] Notice: The term of this patent shall not extend beyond the expiration date of Pat. No. 5,610,215.

[21] Appl. No.: 476,323

[22] Filed: Jun. 7, 1995

Related U.S. Application Data

[62] Division of Ser. No. 156,999, Nov. 24, 1993, Pat. No. 5,610,215, which is a continuation of Ser. No. 707,890, May 31, 1991, abandoned, and a continuation-in-part of Ser. No. 504,317, Apr. 3, 1990, abandoned.

[51] Int. Cl.$^6$ ................................................. B32B 15/08
[52] U.S. Cl. ................................. 427/388.4; 427/388.2
[58] Field of Search ........................ 524/376, 548, 524/517, 522, 523, 526, 558, 520; 427/385.8, 386, 388.2, 388.4

[56] References Cited

U.S. PATENT DOCUMENTS

| | | |
|---|---|---|
| 3,725,328 | 4/1973 | Bowell et al. . |
| 3,879,326 | 4/1975 | Burge, Jr. . |
| 3,950,290 | 4/1976 | Drury, Jr. et al. . |
| 4,097,439 | 6/1978 | Darling . |
| 4,126,652 | 11/1978 | Oohara et al. . |
| 4,150,005 | 4/1979 | Gehman et al. ............... 524/460 |
| 4,172,066 | 10/1979 | Zweigle et al. . |
| 4,284,546 | 8/1981 | Delfosse et al. . |
| 4,366,282 | 12/1982 | Zima et al. . |
| 4,377,661 | 3/1983 | Wright et al. . |
| 4,383,062 | 5/1983 | Saad et al. . |
| 4,384,661 | 5/1983 | Page et al. . |
| 4,420,340 | 12/1983 | Mohr et al. . |
| 4,444,937 | 4/1984 | Badertacher . |
| 4,456,507 | 6/1984 | Kivel et al. . |
| 4,493,912 | 1/1985 | Dudgeon et al. . |
| 4,518,736 | 5/1985 | Jahn . |
| 4,537,926 | 8/1985 | Kivel et al. . |
| 4,598,114 | 7/1986 | Berens . |
| 4,687,792 | 8/1987 | Russell et al. . |
| 4,776,270 | 10/1988 | Kumamoto . |
| 4,997,877 | 3/1991 | Craig . |
| 5,168,105 | 12/1992 | Anderson, Jr. et al. . |

FOREIGN PATENT DOCUMENTS

| | | |
|---|---|---|
| 0144135 | 10/1984 | European Pat. Off. . |
| 1466064 | 3/1977 | United Kingdom . |

OTHER PUBLICATIONS

Chemistry Man and Society, W.B. Saunders Company (1972) pp. 583–590.
General Applied Chemistry, Stanley E. Manahan, Univ. Missouri (1978) pp. 395–399.
Price List, Walthars Catalog (1984) pp. 591–592.
Chemical Analysis from Calcoast Analytical, May 9, 1994.
R.Lambourne(ed.)*Paint & Surface Coatings, Theory & Practice* Ellis Horwood, NewYork ©1987, pp. 39–40.

*Primary Examiner*—Jeffrey T. Smith
*Attorney, Agent, or Firm*—Birch, Stewart, Kolasch & Birch, LLP

[57] ABSTRACT

An aqueous emulsion coating composition exhibiting a viscosity of at least 20 centapoise, containing a binder with a molecular weight of preferably at least 50,000, and more preferably, greater than 500,000, and a glass transition temperature of at least 10° C., and a filler, wherein the binder is present in about 20 parts to about 50 parts by weight and the filler up to about 60 parts by weight. The composition also contains effective amounts of one or more additives consisting of coalescents, humectants, thickeners, surfactants and defoamers. The composition is particularly well suited to application to substrates common to the hobby, modeling and toy industry. Generally, it is preferred to apply the hobby/modeling composition via an air brush and allow the coating to cure at temperatures at least 13° C. for as long as one week to generate the maximum obtainable properties.

37 Claims, No Drawings

AQUEOUS EMULSION-BASED COATING COMPOSITIONS

This application is a divisional of application Ser. No. 08/156,999, filed on Nov. 24, 1993, now U.S. Pat. No. 5,610,215, the entire contents of which are hereby incorporated by reference; which is a continuation of application Ser. No. 07/707,890, filed on May 31, 1991, now abandoned, and is a continuation-in-part of Ser. No. 07/504,317, filed Apr. 3, 1990, now abandoned.

TECHNICAL FIELD

The invention relates generally to aqueous emulsion based coating compositions and, more specifically, to coating compositions which are particularly well suited for a wide variety of substrates common to the hobby, modeling and toy industry.

BACKGROUND OF THE INVENTION

Although aqueous emulsion paints have been known and used for decades, recent research and development efforts have been directed to water-based compositions which perform comparable to solvent-based paints in weathering, durability, and flexibility. Such activity arises out of concerns for the pollution and health hazards associated with the use of solvent-based paints. The U.S. Environmental Protection Agency has set 1991 as the date for restricting solvent-based paints for commercial use.

Paints as coatings on substrates have long been used for appearance and for protection against weathering as well as, for example, safety insulation, and vapor barrier. Paints are generally considered to be composed of four basic components: pigment(s), binder (or nonvolatile vehicle), volatile vehicle (or carrier), and additives. Pigments, which may be either organic or inorganic compositions, supply the desired color of a paint and are selected for proper opacity and gloss. The binder is a substance which, when exposed to the atmosphere or heat, forms a dry coating or film, and provides the medium for the pigment. Binders are typically resins (often synthetic polymeric materials), drying oils, or mixtures of such materials. The volatile vehicle may make up to 50% of the volume of the paint, but is vaporized into the atmosphere when the paint is dried or cured. The volatile vehicle in solvent-based (also called solvent-borne) paints is typically an organic solvent, such an aromatic hydrocarbon (e.g., xylene or toluene) or an aliphatic hydrocarbon (e.g., mineral spirits or naphtha), while the volatile vehicle in water-based (also called water-borne) paints is, of course, water. In the largest group of water-based paints, the binder is emulsified into the water medium, i.e., the binder is dispersed as tiny droplets in the water, the binder being the internal phase and the water being the external phase. These paints are also referred to as emulsion paints or emulsion-based paints.

Additives are agents used to facilitate acceptable film formation. Additives for a typical water-based paint include coalescents, thickeners, defoamers, preservatives, pH controllers, and anti-freezes. Coalescents are typically added to plasticize the binder temporarily during film formation so that the emulsion particles coalesce. Thickeners are often added to promote suspension of the pigment during storage, proper rheology for application, and flow without sagging. Preservatives are often added for protection during storage against bacterial attack, while the other additives are added to minimize foaming, adjust pH, prevent surface defects, and provide freeze/thaw stability.

The hobby, model and toy industry has been an area where very little choice is available for water-based paints. Since the 1930's, the hobby industry has generally had to accept the coatings technology used in other industries, for example, automotive lacquers and enamels. When lead pigments were required to be replaced with more user and environmentally friendly alternatives, many of the hobby paints were removed from the market. Only a limited number of companies continued to bottle solvent-borne hobby coatings.

Only after the federal Environmental Protection Agency (and California Air Quality Control Council) took steps to alert the general public to the dangers involved in the constant use of solvent-borne hobby paints, did the industry attempt to respond with water clean up or water-borne paints. These formulations were at best inadequate, providing poor opacity and adhesion characteristics. While waterborne paints have continued to find acceptance in the art materials area, providing acceptable adhesion for canvas and paper substrates, the hobbyist/modeler found that he or she was unable to successfully use these coatings over the wide variety of substrates commonly encountered. Solvent based paints still remain the standard in the art.

Meanwhile, the hobby industry continues to advance in areas of manufacturing technology and the ability to replicate the very fine detail from the originally modeled object. Contemporary models have very accurate details that are of a very small scale, often down to $\frac{1}{250}$ scale. Suitable coatings and paints must provide thin films which do not hide the details of the model, yet provide good adhesion, flexibility and impact-resistance. Despite recognition of superior safety and environmental properties of water-borne coatings, the art has yet to respond with a water-based coating which can provide the very thin paint film needed to accent the extreme detail of metal and plastic models.

SUMMARY OF THE INVENTION

The present invention provides a coating composition, such as a paint, which exhibits excellent adhesion, gloss retention, abrasion resistance, film formation qualities, and flexibility. The substrate upon which the composition in accordance with the present invention is coated can be bent 180° without cracking, chipping, or loss of adhesion of the dried coating film. Additionally, the composition has a low organic solvent content.

The present invention is an oil-in-water emulsion coating composition having a viscosity of 20 to about 1,500 centipoise, comprising: a film forming binder; fillers mixed with the binder to impart different glosses and colors, and one or more additives to facilitate acceptable film formation selected from the group consisting of thickeners, coalescents, humectants, defoamers, and surfactants. The binder suitably has a glass transition temperature of at least 10° C., preferably at least 30° C., and a molecular weight of at least 50,000, and preferably, greater than about 500,000. The coating composition has a pH of about 3 to about 11. The total solids content of the composition is about 20% to 60% by weight. The composition contains about 20 parts to about 50 parts by weight (pbw) of binder provided as a binder latex, up to about 60 parts (pbw) of filler, and effective amounts of one or more additives. A dried coating of the composition will suitably have a filler-to-binder (including non-volatile solids) ratio, by weight, ranging from 0.0:1 to about 3.0:1, preferably 2.0:1.

The composition in accordance-with the present invention is particularly well suited for application to substrates common to the hobby industry, such as alloyed steel, polystyrene, acrylonitrile-butadiene-styrene, polyformaldehyde, brass, etc. The composition can be used as a finish coat or it may be subsequently detailed, highlighted, stenciled or recoated as though it were a primer. Preferably, the coating composition is applied by spraying techniques, and then dried at ambient temperature, or baked. The film dries quickly with no unpleasant odor. Temperatures from ambient to about 99° C. are preferred, although higher temperatures can be used after the water has been released from the coating.

The water-borne coating composition of the present invention advantageously exhibits superior adhesion to materials used by modelers and achieves extraordinarily fine (thin) film thicknesses with unusually good opacity, and lack of surface defects than prior art compositions. The composition can be applied to a substrate with a resulting film of about 0.25 to $2.5 \times 10^{-3}$ inches (compared to 2 to $8 \times 10^{-3}$ inches for prior art compositions), while maintaining excellent adhesion and flexibility. The film enhances the fine details of the surface to which it is applied instead of physically burying them.

The present composition offers a range of finish appearances, e.g., flat (low gloss), satin (intermediate gloss), and high gloss. Flat was the only finish alternative available in the prior art compositions.

The lack of or low concentrations of organic solvents and plasticizers in the composition in accordance with the present invention reduces or eliminates the environmental and toxicological problems presented by prior art hobby/model coating compositions.

Other advantages and a fuller appreciation of the invention will be gained upon an examination of the following detailed description.

DETAILED DESCRIPTION OF PREFERRED EMBODIMENTS

This invention relates to a composition which provides a highly durable and flexible coating to a wide variety of substrates, with minimal surface preparation necessary. These attributes are achieved through a novel combination of components. This invention also relates to methods of preparing and applying the composition.

The coating composition of the present invention can be applied to almost any surface, but is particularly well suited to substrates used in the hobby-modeling industry, such as steel, aluminum, brass, and the like, and especially, polymeric substrates. However, it should be understood that the coating composition is not limited in its application to such hobby-modeling objects, and is applicable to a broad spectrum of substrates and objects.

In the description of the invention, process steps are carried out and concentrations measured at room temperature (about 20° C. to about 25° C.) and atmospheric conditions unless otherwise specified.

As used herein, and is generally used in the art, the term "binder" refers to an organic film former; while the term "binder latex" refers to any stable dispersion of a binder (or mixtures of binders) in an essentially aqueous medium. By the term "filler" is meant a material which reinforces the coating composition and/or alters the coating gloss and color, for example, a pigment. By the term "thickener" is meant a material which may be used to thicken a liquid, or an additive used to increase viscosity or modify the rheology of a coating. The term "solids content" refers to amounts, by weight, of binder, fillers and nonvolatile additives present in an emulsion composition. The term "glass transition temperature" or "Tg", refers to the inflection temperature found by plotting the modulus of rigidity against temperature. The term "substrate" is meant to refer to a material or substance, e.g., a metal, a plastic, an alloy, or the like, upon whose surface a coating can be applied. The term "preblend" is meant to refer to a mixture of components, typically in an aqueous medium, which have been mixed together prior to inclusion in a coating composition.

In one of its aspects, the invention entails an aqueous emulsion-based composition which comprises a binder, a filler and various additives such as humectants, surfactants, coalescents, and the like. The composition of this invention has a viscosity of 20 to about 1,500 centipoise (cp) and can be thixotropic in nature. The total solids content is about 20% to about 60% solids and about 80% to about 40% water, preferably, 30% to about 50% solids and about 50% to 70% of water. The pH of the composition ranges from about 3 to about 11, preferably, about 7.5 to about 10. Based on the total solids content, the filler-to-binder (including any nonvolatile additives) ratio, by weight, of a dried coating of the composition ranges from 0.0:1 to about 3:1, preferably 0.0:1 to about 2:1.

The binder is suitably a polymer, a block or graft polymer, or interpenetrating network polymers, although copolymers of molecular weight of 50,000 and preferably greater than 500,000, are most suitable. Although cross-linking agents can be used, the coating compositions of this invention, with the exception of a self-cross linking acrylic binder, are preferably thermoplastic. The binders useful in accordance with the present invention generally have a Tg of at least 10° C., preferably, at least 30° C.

Typically, the binder is used as a binder latex. A suitable binder latex has a viscosity of about 200 cp to about 600 cp and is composed of binder particulates having an average (or mean) particle size of less than 5 microns. Preferably, the binder latexes used in this invention are chosen from one of the following groups of polymers and copolymers latexes: water-borne polyurethane dispersions; epoxy-functional emulsions; vinyl acetate copolymers, carboxylated ethylene vinyl acetate, carboxylated acrylic, hydroxy functional acrylic, acrylonitrile functional acrylic, self-crosslinking acrylic, carboxylated polyvinylchloride acrylic, carboxylated styrene butadiene copolymer, styrene butadiene, styrene modified acrylate copolymers, and vinyl pyridine copolymers, and mixtures thereof, dispersed in water.

As is true of latex coatings-in general, the degree and quality of adhesion will depend upon the particular binder/substrate combination chosen. Cold rolled steel, phosphated steel, or brass have been found to provide good adhesion substrates with a wide variety of binders of the present invention. However, where the substrate is polyformaldehyde, carbon composite, or polystyrene, the choice of binder for a given hobby coating becomes critically important. In some instances, the degree of adhesion of a particular composition can also be enhanced by the mixing of different binders. Guided by the principles herein, coatings of suitable composition can be tailored to meet the demands of a given substrate.

In order to achieve the viscosity and thixotropic nature of the composition, and the desired opacity and color, fillers, and additives are included in the composition in accordance with the present invention. The particulates of the filler suitably have an average (or mean) particle size of less than 25 microns. Some of the commercially available suitable fillers are pigments, such as carbon black (e.g., Regal™ black available from Cabot. Co.); phthalo cyanine blue (e.g., Heliogen™ blue available from BASF Co.); isoidoline yellow (e.g. Irgaziner™ yellow available from Ciba Geigy); arylide red (e.g. F3RK—70™ available from Hoechst-Celanese); burnt umber (e.g. 152 domestic available Hoover Co); yellow iron oxide (e.g., Bayferrox™ 3910 available from Mobay Co.); red iron oxide (e.g. such as Bayferrox™ 160M available from Mobay Co.; and other fillers such as aluminum silicate (e.g., ASP-40™ available from Engelhard Co.); magnesium silicate (e.g., Miciotalc MP-10-52™ available from Pfizer Co.); barium sulfate (e.g., Microdine XR Barytes™ available from Smithko); calcium carbonate (e.g., Camelcar™ available from Genstar Co.); amorphous silica (e.g., HK188™ available from Degussa Corp.); micro-crystalline silica (e.g., Imsil™ A108 available from Illinois Minerals Co.).

Generally, thickeners are added in an amount sufficient to attain a desired viscosity and rheology. Only small amounts are used, preferably about 0.1% to about 10% by weight of the coating composition, although thickeners are not essential. The following are some commercially available thickeners which are suitable for use with this invention: hydroxypropyl methylcellulose, (e.g., Methocel™ available from Dow Chemical Co.); hydroxy ethyl cellulose (e.g., Natrosol™ available from Aqualon Co.); hydrous magnesium silicate (e.g., Bentone™ available from Rheox); neutralized polyacrylate copolymers (e.g., Acrysol™ available from Rohm & Haas Co.); and associative urethane thickener (e.g., QR-708™ available from Rohm & Haas Co.).

Other beneficial additives are surfactants, coalescents or filming, aids, humectants, and defoamers.

Surfactants (surface active or surface tension modifying agents) are beneficial for increasing dispersion of fillers and minimizing formation of surface defects of the coating. For example, where pigments such as carbon black or phthalo blue are used, addition of a surfactant, such as octylphenoxy polyethoxy ethanol (e.g., Triton™ X-100 available from Union Carbide, Inc.) facilitates dispersion of the pigment. Other dispersion, facilitating surfactants can be used, however, preferably, such surfactants are nonionic and fugitive. A fugitive surfactant is one that will be stable over a wide range of pH and one that will evaporate from the film of the applied coating. The concentration of these surfactants is suitably about 0.5% to about 10% by weight of the pigment weight used.

As noted above, other surfactants can be added to minimize the formation of surface defects. Commercially available surface tension modifiers of this type which are suitably used in the composition of the present invention are: polysiloxane copolymers (e.g., Byk™ 301 and Byk™ 306 available from Byk-Chemie; or Raybo 61 Aqua Wet™ available from Raybo Chemicals); acetylenic alcohols or glycols or their ethoxylated derivatives (e.g., Surfynol™ 104E and Surfynol™ 440 available from Air Products, Inc.). The concentration of such surface tension modifiers is suitably about 0.2% to about 3% by weight of coating composition.

Many of the conventional flow or filming aids enhance flow, minimize foaming and sometimes improve freeze-thaw stability while aiding the coalescence of the applied coating which promotes a more continuous coating. Some flow aids include esters of lactic acid, 2-butoxy ethanol, esters of phthalic acid, 2-(2-butoxy ethoxy) ethanol, methyl phenyl carbinol, ethylene glycol, diethyleneglycol, diacetone alcohol, propylene glycol mono and diethers of ethylene or propylene glycol, and the like. Coalescing agents include external coalescents and internal coalescents. External coalescents, such as 2-butoxy ethanol, are soluble in the external aqueous phase of the emulsion composition, while internal coalescents, such as butyl octyl phthalate, are soluble in the internal phase.

Mixtures of these flow aids may also be used. One mixture of flow aids which has been found to be particulary useful in the composition of the present invention has the following relative amounts of components: 71 parts 2-butoxy ethanol; 6 parts butyl octylphthalate; 12 parts propylene glycol. The use of a mixture Such as this allows the utilization of components that have desirable properties over and above their flow characteristics. For example, propylene glycol improves not only flow characteristics, but also freeze-thaw stability of a coating composition, and also retards the drying rate, thus preventing skinning and providing for a more continuous film. 2-butoxy ethanol is an external coalescent and also depresses the surface tension of the composition to encourage better wetting of the substrate. Butyl octylphthalate is an internal coalescent.

Due to the extremely fine detail found on modeling substrates, it is necessary to assure that the film on the substrate forms without premature surface skinning which would entrap significant portions of volatile material. This is accomplished by including humectants in the composition of the present invention. Some suitable humectants are ethylene glycol, propylene glycol, 2-butoxy ethanol, 2-(2-butoxy ethoxy) ethanol, and a variety of lactic acid esters. It has been found that a combination of propylene glycol and the butyl ester of lactic acid is particularly useful in the composition of the present invention. Propylene glycol performs two functions in the composition. First, it holds the film open so that the water can evaporate. Secondly, it imparts a measure of freeze-thaw stability. The concentration of humectants in the present composition generally ranges from about 5% to about 15% by weight of the coating composition.

Defoamers are used to prevent or minimize foaming. A wide variety of defoamers may be used for this purpose. A few of the commercially available defoamers which are suitable in the present composition are: mineral oil-type defoamers (e.g., Colloids 643™, Colloids 640™, and Colloids 647™ available from Colloid Inc.); nonsilicone type defoamers (e.g., Interfoam X1-7™ available from Akzo Inc.); blends of nonionic surfactants and petroleum hydrocarbons (e.g., Foamaster VL™ available from Diamond Shamrock Corp.); and stearate modified defoamers (e.g., Dee-Fo 918™, Dee-Fo 233™, and Dee-Fo 97-3™ available from Ultra Adhesives Inc.). The concentration of defoamers is suitably 0% to about 1% by weight of the coating composition.

The composition of this invention can be formed in the following manner: a defoamer is first added to a starting binder latex having a low viscosity, typically in the range of 200–600 cp. This mixture is slowly stirred with the addition of a preblend of internal and external coalescents and humectants. Thickeners may then be added, and, if necessary, fillers to modify the color and gloss attributes of the composition. Mixing is continued until the average particle size of the fillers is less than 25 microns. This entire mixing process preferably takes place at room temperature, although temperatures of from 10° C. to 82° C. are acceptable.

The coating composition of the present invention can be applied with a variety of applicators, for example, a spray apparatus, or applied manually by brush. The preferred method of application of the composition is air brushes and spray guns designed around Bernoulli's theorem of aspiration and atomization. Small amounts of additional water may be added to improve the atomization characteristics of a given spray apparatus.

As is known to the skilled, surface preparation of a substrate has been vital to the coating effectiveness. However, the coating composition of the present invention requires less tedious and intensive preparation for substrate surfaces than has been conventional in the art. For example, in coating metals, such brass, aluminum, steel, and copper, surface preparation has always been essential to application and proper adhesion of a coating. For example, a combination of solvent cleaning or anodization, and even light abrasive blasting (aluminum oxide, 220 to 100 grit) is conventionally used to prepare the surface of aluminum substrates for coating adhesion. Brass, bronze and copper required not only cleaning but also application of a zinc chromate primer.

It has found that for application of the coating composition of the present invention, the surface of metals can be prepared by simple cleaning with a detergent (for example, Dawn™ or Lemon Joy™ brand detergents available from Proctor & Gamble Co.) which can remove any oils used in its manufacture, followed by rinsing in water at 120° C. or more, and air drying at ambient temperature. If a common detergent will not remove oily substances from the substrate surface, isopropyl alcohol can be used prior to washing.

Surface preparation for plastics in accordance with the present invention is substantially similar to that for metals, although plastic substrates have the largest variety of hardnesses and surface dynamics. With the exception of some types of nylon, surfaces of substrates such as polyfluorocarbons, polyformaldehydes, polystyrene, synthetic rubber, acrylonitrile-butadiene-styrene and unsaturated polyester, need only be cleaned with a detergent, rinsed in hot water at 120° C. or higher, and air dried.

As an alternative to the sealer typically applied to wood, which is a porous material, the coating composition of the present invention can be thinned with water to a viscosity of 20 cp to 40 cp and applied with a soft sponge or cotton cloth as in applying stains. After the conventional sanding to remove the wood fibril, the full strength color coating can be applied.

Hard shell casting materials, such as plaster and other porous casting compounds used in the hobby and craft areas, can be finished with the coating composition of the present by spray (air-brush) or brush, sponge and cotton swab application. Any of the very porous materials, once coated with the composition in accordance with the present invention, are not subject to dimensional distortion due to hydration/dehydration cycling of the casting material. The coating composition of the present invention effectively provides for much better moisture vapor barrier protection than prior art compositions in damp and high humidity areas.

The coating composition in accordance with the present invention forms a film quickly without the use of commercial heaters or ovens. Curing for as long as one week provides, optimal performance properties. The dried coating provided by the present composition is characterized by very good adhesion, resistance to light impact (light impact being impact found in normal, expected handling and use), and extreme flexibility (can be bent over 180° with no chipping or loss of adhesion). Since the range of scales in the hobby industry spans $\frac{1}{100}$ to $\frac{1}{2}$ inch scale, the coating film must be suitable for color coating $\frac{1}{250}$ inch scale details as well as $\frac{1}{2}$ inch scale details without completely hiding the extreme details. The coating composition of the present invention can be applied to a substrate with the resulting thickness of the dried coating per coat of about 0.25. to about $2.5 \times 10^{-3}$ inches, compared to the 2 to $8 \times 10^{-3}$ inches typical for prior art coatings. Such a dried coating film has unusually good opacity, lacks surface defects, and enhances the fine details of the surface to which it is applied instead of physically burying them.

The dried coating has also been shown to be capable of reflowing at temperatures above its glass transition temperature. This property is important in instances where a coating has been applied with an objectionable degree of overspray or where a slightly higher gloss or distinctiveness of image is desired.

The composition of the present invention can provide a dried coating in flat, satin and gloss finishes; such a range of finishes is not offered by water-borne paints of the prior art.

The coating composition has been tested on a wide range of substrates and scales, using the following tests:

ADHESION TAPE TEST (ASTM D3359)

This test is used to establish whether the adhesion of a coating to a substrate is at a generally adequate level. This adhesion test involves cutting a lattice pattern with either six or eleven cuts in perpendicular directions in the film coated on the substrate; pressure-sensitive tape is applied over the lattice and then removed, and adhesion is evaluated by comparison with standard descriptions and illustrations, with a scale from 0B (failure) to 5B (very good). This test does not distinguish between higher levels of adhesion for which more sophisticated methods of measurement are required.

ELONGATION TEST WITH CONICAL MANDREL APPARATUS (ASTM D-522)

This test measures flexibility of a coating. The coating whose elongation is to be determined is applied to clean base substrate panels in such a manner that a coating of uniform thickness is obtained. The panels are bent over mandrels and observed for signs of coating failure. The time between the application of the coating and the testing of the specimen, as well as the temperature and humidity environment used for maturing the coating film during this period, are noted and normalized across the various samples tested.

Flexibility of paint films on a substrate depends not only on the distensibility of the paint film but also on the adhesion between the paint film and the substrate. Good adhesion tends to give better apparent flexibility than does poor adhesion. Flexibility of a paint film, in large part, determines the ability of the film to resist cracking, chipping and mechanical deformation. Generally, the tests used to evaluate flexibility are much more severe than actual service conditions.

RAPID DEFORMATION TEST (ASTM D-2794)

This test measures impact resistance. The coatings under test are applied to suitable thin substrate panels in a reproducible manner. After the coatings have cured and aged in similar manners, a standard weight is dropped a distance so as to strike an indenter that deforms the coating and the substrate. The indentation can be either an intrusion or an extrusion. By gradually increasing the distance the weight drops, the point at which failure usually occurs can be determined. Normally, results are reported in inch-pounds as the highest level (i.e. distance) that just passes the test.

Having described the invention in general, listed below are specific examples of coating compositions according to the present invention, wherein all parts are parts by weight and all temperatures are in degrees Celsius unless otherwise indicated.

EXAMPLE 1

To 3140 parts of Polymer Spensol L-41™ brand polyurethane dispersion, available from Reichhold Chemicals, was added 4780 parts of Copolymer Rhoplex WL-96™ brand nitrile functional acrylic, available from Rohm & Haas, and then 1 part Colloid 643™ brand mineral oil based defoamer, available from Colloids Inc. This mixture was slowly agitated until it was homogeneous. To this homogeneous mixture was added 48 parts of W-23™ brand multifunctional synergistic blend of surfactants, available from Daniels Products, which serves as a dispersing aid; 96 parts propylene glycol, 946 parts of RCL-2™ brand titanium dioxide, available from SCM Inc., and 110 parts of Nicron 660™ brand magnesium silicate, available from Montana Talc Inc. This admixture was mixed until the average particle size of the pigments and other fillers were reduced to less than 25 microns. To the homogeneous admixture was added a preblend of 38 parts 2-butoxy ethanol, and 13 parts QR-708™ brand associative urethane thickener, available from Rohm & Haas. The resulting composition was further tinted with WD2432 LT™ brand lemon yellow oxide, WD2228™ brand phthalo blue, and WD2345™ brand tinting black premanufactured pigment dispersions, available from Daniels Products, to match a pre-existing, standard color panel. The Brookfield viscosity of the resulting composition using RVF #2 spindle at 10 RPM was 120 cp.

The coating composition was then applied to an aluminum substrate by spraying at a pressure of 30 psi, with a model 200 single action internal mix air brush with a Badger 380 II air compressor and having a spray fan range of ¼ inch to 3 inch at a target distance of 1½ inch to 6" inch. The coating was allowed to sit for 2 minutes at ambient temperature; then the temperature was gradually increased to somewhat less than 100° C. over an 8 minute period and held constant for an additional 7 minutes. An alternate coating schedule was to submit the coating to 15 minutes at 100° C. and air dry at ambient temperature for 7 days before the ultimate properties are achieved. The coating exhibited very good adhesion (5B on the adhesion test), impact resistance greater than or equal to 80 inch-pounds, and elongation equal or greater than 25%. Similar results were obtained with steel, fiberglass, and polystyrene substrates.

EXAMPLE 2

560 parts of the Goodrite 2508×34™ brand vinyl-pyridine copolymer, available from B. F. Goodrich, for a water-based latex, and 25 parts of Rhoplex HA-12™ brand self-crosslinking acrylic polymer, available from Rohm & Haas, were placed in a mixing apparatus. To this mixture was added 1 part of Colloids 681™ brand high boiling mineral type defoamer modified with silicone, available from Colloids Inc., and then a preblend of 31 parts water, 6.25 parts of Santicizer 160™ brand butyloctylphthalate, available from Monsanto, and 61 parts of butyl lactate, available from Purac Incorporated. This mixture was stirred until a smooth homogenized composition was achieved. To this aqueous composition was added a preblend of 150 parts water, 25 parts of Surfynol 61™ brand dimethyl hexynol, available from Air Products, Inc., which serves as a dispersing aid for 250 parts of F3RK-70™ brand arylide red, available from Hoechst-Celanese. The resulting aqueous emulsion-based composition had a viscosity of 320 cp. When applied to synthetic rubber using a similar application procedure as described in Example 1, this composition exhibited good adhesion and flexibility.

EXAMPLE 3

Using the procedure of Example 2, 5.6 parts Dee-Fo 233™ brand stearate modified defoamer, available from Ultra Adhesives, Inc., was added to 2542 parts of Neocryl A-655 brand carboxyl functional acrylic copolymer, available from ICI Resins U.S., and a preblend of 175 parts 2-(2-butoxy ethoxy) ethanol, 170 parts water, and 38 parts Santicizer 160™ brand butyl octylphthalate, available from Monsanto Co. To this admixture was added a preblend of 30 parts 2-butoxy ethanol and 10 parts of QR-708™ brand associative urethane thickener, available from Rohm & Haas. The resulting admixture was then tinted with 300 parts Aurasperse W-7017™ brand carbon black premanufactured pigment dispersion, available from Englehard Inc. When applied to a brass substrate as described in Example 1, a film was formed with good gloss (75% at 60° C.), excellent adhesion (5B), an impact resistance of 160/56 (direct/reverse) inch-pounds and no evidence of failure over a ⅛ inch diameter mandrel.

EXAMPLE 4

Using the procedure of Example 2, 3.8 parts of a Colloids 643™ brand high boiling mineral type defoamer modified with a silicone, available from Colloids, Inc., was added to 500 parts of Dow Latex 460™ brand styrene-butadiene polymer, available from Dow Chemical, and 1680 parts of WL-51™ brand styrene modified acrylate copolymer, available from Rohm & Haas. To this mixture was added a preblend of 320 parts 2-butoxy ethanol, 62 parts 2-(2-butoxy ethoxy) ethanol, 51 parts dibutyl phthalate and 12 parts of 28% aqueous ammonia. This composition, as a clear, was applied to a polystyrene Substrate, as described in Example 1. The resulting film had good flexibility and adhesion, although over a period of 4 months at ambient temperature a small decline in the flexibility was noted.

EXAMPLE 5

Using the procedure of Example 2, 3 parts high Foam Blast 384™ brand boiling mineral oil type defoamer, available from Ross Chemicals, Inc., was added to a mixture of 1000 parts of Neocryl A-655™ brand carboxyl functional acrylic copolymer, available from ICI Resins U.S., and 500 parts of UCAR 354™ brand vinyl acetate copolymer, available from Union Carbide Inc. To this mixture was added a pre-blend of 6 parts 28% aqueous ammonia, 150 parts methyl phenyl carbinol, 60 parts water, and 50 parts of diacetone alcohol. To the admixture was added 600 parts of a pre-manufactured pigment dispersion which consisted of 360 parts water, 48 parts Joncryl 678™ brand acrylic resin, available from Johnson Wax, and 10 parts of 28% aqueous ammonia. The resulting composition was applied to an aluminum substrate as described in Example 1. The resulting film exhibited good adhesion and good flexibility. When applied to cathodically electrocoated steel the adhesion results were only fair.

EXAMPLE 6

Using the procedure of Example 2, 4 parts Foam Blast 384™ brand high boiling mineral Dil type defoamer, available from Ross Chemicals Inc., was added to 388 parts methyl carbitol, 15.4 parts of Triton CF-10™ brand nonionic surfactant, available from Rohm & Haas, 1940 parts of Tipure R-900™ brand titanium dioxide, available from E. I. DuPont, and 199 parts of water. The admixture was ground to a mean particle size of less than 25 microns. To this ground admixture was added 4610 parts of Maincote AE-58™ brand acid functional acrylic, available from Rohm & Haas, 492 parts of water, 18 parts of 28% ammonia, 294 parts butyl octylphthalate, 90 parts of 15% aqueous sodium nitrite and 88 parts of Acrysol RM-1020™ brand associate urethane thickener, available from Rohm & Haas. To this resulting admixture was added 1/4 part by volume of a pre-manufactured blend of 1255 parts Epi-Rez WJ-3520™ brand emulsified epoxy, available from Hi-Tek Polymers, and 471 parts water. The above composition was applied to a lead-tin alloy substrate conventionally used in model objects by the method described in Example 1. The resulting adhesion was excellent, and flexibility such that the film showed no evidence of failure over a ⅛ inch mandrel.

EXAMPLE 7

Using the procedure of Example 2, 2.2 parts of Interfoam X1–7™ brand nonsilicone defoamer, available from Akzo Inc., was added to 500 parts Neocryl A-655™ brand carboxyl functional acrylic, available from ICI Resins U.S., and 100 parts of Airelex 416™ brand carboxyl functional ethylene vinyl acetate copolymer, available from Air Products. To this mixture was added a coalescent preblend, consisting of 60 parts 2-butoxy ethanol, 18 parts 2-(2-butoxy ethoxy). ethanol, and 6 parts of 28% aqueous ammonia. To this resulting admixture was added a preblend of 38 parts 2-butoxy ethanol, and 13 parts QR-708™ brand associative urethane thickener, available from Rohm & Haas. To tint the resulting composition, premanufactured tint pastes as described in Example 1, available from Daniels Products, were used. The coating was applied to plastic Kralastic™ brand acrylonitrile-butadiene-styrene (ABS), available from Uniroyal Inc., using the application method described in Example 1. The resulting film exhibited excellent adhesion and impact resistance.

EXAMPLE 8

Using the procedure of Example 2, 5.2 parts Dee-Fo 918™ brand stearate modified defoamer, available from Ultra Adhesives Inc., was added to 300 parts of Hycar 450×60™ brand carboxylated polyvinyl chloride acrylic, available from B. F. Goodrich, and 300 parts of the PL-208™ brand carboxylated styrene butadiene resin, available from Polysar Inc. The resulting admixture was combined with the preblended mixture of coalescents described in Example 7. The clear resulting composition was applied to a sheet nylon using the application method described in Example 1. The resulting adhesion of the film was excellent.

EXAMPLE 9

Using the procedure of Example 2, 4 parts Foam Blast 384™ brand high boiling mineral oil type defoamer, available from Ross Chemicals, Inc., was added to 340 parts Joncryl 540™ brand hydroxyl functional acrylic, available from Johnson Wax. To this mixture was added 7 parts of Surfynol 104™ brand tertiary acetylenic diol, available from Air Products, Inc., 8 parts AMP-95™ brand 2-amino-2-methyl-L-propanol, available from Angus Chemical, and 400 parts RCL-2™ brand titanium dioxide, available from SCM Pigments. This mixture was dispersed at high speed to yield a mean particle size of less than 25 microns. To this admixture was added 530 parts Joncryl 540™ brand hydroxyl functional acrylic, available from Johnson Wax, 220 parts water and a pre-blend of 50 parts 2-butoxy ethanol and 200 parts Melamine Cymel 303™ brand hydroxy methoxy methylmelamine, available from American Cyanamid. The resulting composition was applied to phosphated steel in the manner described in Example 1. After a rest period of 8 minutes at ambient temperature and a 13 minute bake cycle at 130° C., a film of good hardness and impact resistance resulted.

While the invention has now been disclosed with reference to certain preferred embodiment and exemplified with regard thereto, those skilled in the art will appreciate the various modifications, including variations, additions and omissions, that may be made without departing from the scope of the invention. Accordingly, it is intended that such modifications be encompassed by the present invention and that the scope of the present invention be limited solely by the broadest interpretation accorded the appended claims.

We claim:

1. A method of coating a substrate commonly used for modeling and toys which comprises:

applying to a substrate commonly used for modeling or toys an aqueous emulsion-based coating composition consisting essentially of:

(A) about 20 parts to about 50 parts by weight of a latex binder having a Tg of at least 30° C. selected from the group consisting of waterborne polyurethane dispersions, epoxy emulsions, vinyl acetate copolymers, carboxylated ethylene vinyl acetate, carboxylated acrylic copolymers, hydroxy acrylic copolymers, acrylonitrile acrylic copolymers, self-crosslinking acrylic copolymers, carboxylated polyvinylchloride acrylic copolymers, carboxylated styrene-butadiene copolymer, styrene butadiene, styrene-acrylate copolymers, and vinyl-pyridine copolymers, and mixtures thereof, dispersed in water;

(B) up to about 60 parts by weight of a filler selected from the group consisting of pigments, aluminum silicate, magnesium silicate, barium sulfate, calcium carbonate, amorphous silica, microcrystalline silica, and mixtures thereof, and (C) coalescents in an amount of 2.8% to 16.5% by weight of said coating composition, and humectants in an amount of about 5% to about 15% by weight of said coating composition, said composition having a viscosity of from about 20 centipoise to about 1500 centipoise as measured using a standard Brookfield viscosity test using a RVT #2 spindle at 10 RPM, a filler to binder ratio of from 0.1:1 to about 3:1, and a total solids content of 20% to 60% by weight; and drying said coating composition to form a dried film coating on said substrate.

2. The method according to claim 1, wherein said applying is by a spray apparatus.

3. The method according to claim 1, wherein said applying is by brush.

4. The method according to claim 1, wherein said dried film coating has a thickness of $0.25 \times 10^{-3}$ to $2.5 \times 10^{-3}$ inches.

5. The method according to claim 1, wherein said dried film coating has an adhesion tape test rating of 5B, using the procedure outlined under ASTM D3359.

6. The method according to claim 1, wherein said substrate is a metal.

7. The method according to claim 1, wherein said substrate is a plastic.

8. A method of coating a substrate commonly used for modeling and toys which comprises:

applying to a substrate commonly used for modeling or toys an aqueous emulsion-based coating composition for substrates commonly used for modeling and toys consisting essentially of:

(A) about 20 parts to about 50 parts by weight of a carboxylated acrylic copolymer latex binder having a Tg of at least 30° C. dispersed in water;

(B) up to about 60 parts by weight of a filler selected from the group consisting of pigments, aluminum silicate, magnesium silicate, barium sulfate, calcium carbonate, amorphous silica, microcrystalline silica, and mixtures thereof, and (C) coalescents in an amount of 2.8% to 16.5% by weight of said coating composition, and humectants in an amount of about 5% to about 15% by weight of said coating composition, said composition having a viscosity of from about 20 centipoise to about 1500 centipoise as measured using a standard Brookfield viscosity test using a RVT #2 spindle at 10 RPM, a filler to binder ratio of from 0.0:1 to about 3:1, and a total solids content of 20% to 60% by weight; and drying said coating composition to form a dried film coating on said substrate.

9. A method of coating a substrate commonly used for modeling and toys which comprises:

applying to a substrate commonly used for modeling or toys an aqueous emulsion-based coating composition for substrates commonly used for modeling and toys consisting essentially of:

(A) about 20 parts to about 50 parts by weight of a latex binder having a Tg of at least 30° C. selected from the group consisting of waterborne polyurethane dispersions, epoxy emulsions, vinyl acetate copolymers, carboxylated ethylene vinyl acetate, carboxylated acrylic copolymers, hydroxy acrylic copolymers, acrylonitrile acrylic copolymers, self-crosslinking acrylic copolymers, carboxylated polyvinylchloride acrylic copolymers, carboxylated styrene-butadiene copolymers, styrene butadiene, styrene-acrylate copolymers, and vinylpyridine copolymers, and mixtures thereof, dispersed in water;

(B) up to about 60 parts by weight of a filler selected from the group consisting of pigments, aluminum silicate, magnesium silicate, barium sulfate, calcium carbonate, amorphous silica, microcrystalline silica, and mixtures thereof, and (C) coalescents in an amount of 2.8% to 16.5% by weight of said coating composition, and humectants in an amount of about 5% to about 15% by weight of said coating composition, said composition having a viscosity of from about 20 centipoise to 320 centipoise as measured using a standard Brookfield viscosity test using a RVT #2 spindle at 10 RPM, a filler to binder ratio of from 0.0:1 to about 0.8:1, and a total solids content of 20% to 60% by weight; and drying said coating composition to form a dried film coating on said substrate.

10. A method of coating a substrate commonly used for modeling and toys which comprises:

applying to a substrate commonly used for modeling or toys an aqueous emulsion-based coating composition for substrates commonly used for modeling and toys consisting essentially of:

(A) about 20 parts to about 50 parts by weight of a latex binder having a Tg of at least 30° C. and selected from the group consisting of waterborne polyurethane dispersions, epoxy emulsions, vinyl acetate copolymers, carboxylated ethylene vinyl acetate, carboxylated acrylic copolymers, hydroxy acrylic copolymers, acrylonitrile acrylic copolymers, self-crosslinking acrylic copolymers, carboxylated polyvinylchloride acrylic copolymers, carboxylated styrene-butadiene copolymers, styrene butadiene, styrene-acrylate copolymers, and vinylpyridine copolymers, and mixtures thereof, dispersed in water;

(B) up to about 60 parts by weight of a filler selected from the group consisting of pigments, aluminum silicate, magnesium silicate, barium sulfate, calcium carbonate, amorphous silica, microcrystalline silica, and mixtures thereof, and (C) coalescents in an amount of 2.8% to 16.5% by weight of said coating composition, and humectants in an amount of about 5% to about 15% by weight of said coating composition, said composition having a viscosity of from about 20 centipoise to 320 centipoise as measured using a standard Brookfield viscosity test using a RVT #2 spindle at 10 RPM, a filler to binder ratio of from 0.0:1 to about 0.8:1, and a total solids content of 20% to 60% by weight; and drying said coating component to form a dried film coating on said substrate.

11. The method according to claim 1, wherein said coating composition enhances the detail of said substrate.

12. The method according to claim 8, wherein said coating composition enhances the detail of said substrate.

13. The method according to claim 9, wherein said coating composition enhances the detail of said substrate.

14. The method according to claim 10, wherein said coating composition enhances the detail of said substrate.

15. The method according to claim 1, wherein said composition has a viscosity from about 20 centipoise to 320 centipoise as measured by a standard Brookfield viscosity test using RVT #2 spindle at 10 RPM.

16. The method according to claim 8, wherein said composition has a viscosity from about 20 centipoise to 320 centipoise as measured by a standard Brookfield viscosity test using RVT #2 spindle at 10 RPM.

17. The method according to claim 1, wherein said composition has a viscosity in the range of 48 to 320 centipoise as measured by a standard Brookfield viscosity test using RVT #2 spindle at 10 RPM.

18. The method according to claim 8, wherein said composition has a viscosity in the range of 48 to 320 centipoise as measured by a standard Brookfield viscosity test using RVT #2 spindle at 10 RPM.

19. The method according to claim 1, wherein said latex binder in said composition is a carboxylated acrylic copolymer.

20. The method according to claim 1, wherein said composition has a filler to binder ratio of 0.0:1 to 0.8:1 and the viscosity of 48–320 cps as measured by the Brookfield viscosity test using RVT #2 spindle at 10 RPM.

21. The method according to claim 8, wherein said composition has a filler to binder ratio of 0.0:1 to 0.8:1 and the viscosity of 48–320 cps as measured by the Brookfield viscosity test using RVT #2 spindle at 10 RPM.

22. The method according to claim 9, wherein said composition has a viscosity in the range of from 48 centipoise to 320 centipoise as measured by a standard Brookfield viscosity test using RVT #2 spindle at 10 RPM.

23. The method according to claim 10, wherein said composition has a viscosity in the range of from 48 centipoise to 320 centipoise as measured by a standard Brookfield viscosity test using RVT #2 spindle at 10 RPM.

24. The method according to claim 8, wherein said dried film coating exhibits an adhesion tape test rating of 5B, as measured using the procedure outlined under ASTM D-3359.

25. The method according to claim 9, wherein said dried film coating exhibits an adhesion tape test rating of 5B, as measured using the procedure outlined under ASTM D-3359.

26. The method according to claim 10, wherein said dried film coating exhibits an adhesion tape test rating of 5B, as measured using the procedure outlined under ASTM D-3359.

27. The method according to claim 8, wherein said dried film coating has a thickness of $0.25 \times 10^{-3}$ to $2.5 \times 10^{-3}$ inches.

28. The method according to claim 9, wherein said dried film coating has a thickness of $0.25 \times 10^{-3}$ to $2.5 \times 10^{-3}$ inches.

29. The method according to claim 10, wherein said dried film coating has a thickness of $0.25 \times 10^{-3}$ to $2.5 \times 10^{-3}$ inches.

30. The method according to claim 1, wherein said dried film coating is a flexible coating and exhibits an elongation rating equal to or greater than 25% as measured using the procedure outlined under ASTM D-522.

31. The method according to claim 8, wherein said dried film coating is a flexible coating and exhibits an elongation rating equal to or greater than 25% as measured using the procedure outlined under ASTM D-522.

32. The method according to claim 9, wherein said dried film coating is a flexible coating and exhibits an elongation rating equal to or greater than 25% as measured using the procedure outlined under ASTM D-522.

33. The method according to claim 10, wherein said dried film coating is a flexible coating and exhibits an elongation rating equal to or greater than 25% as measured using the procedure outlined under ASTM D-522.

34. The method according to claim 1, wherein said dried film coating exhibits an impact resistance greater than or equal to 80 inch-pounds as measured using the procedure outlined under ASTM D-2794.

35. The method according to claim 8, wherein said dried film coating exhibits an impact resistance greater than or equal to 80 inch-pounds as measured using the procedure outlined under ASTM D-2794.

36. The method according to claim 9, wherein said dried film coating exhibits an impact resistance greater than or equal to 80 inch-pounds as measured using the procedure outlined under ASTM D-2794.

37. The method according to claim 10, wherein said dried film coating exhibits an impact resistance greater than or equal to 80 inch-pounds as measured using the procedure outlined under ASTM D-2794.

\* \* \* \* \*